April 14, 1925.
A. O. NORDINE
1,533,449
TRAILER
Filed Dec. 31, 1923
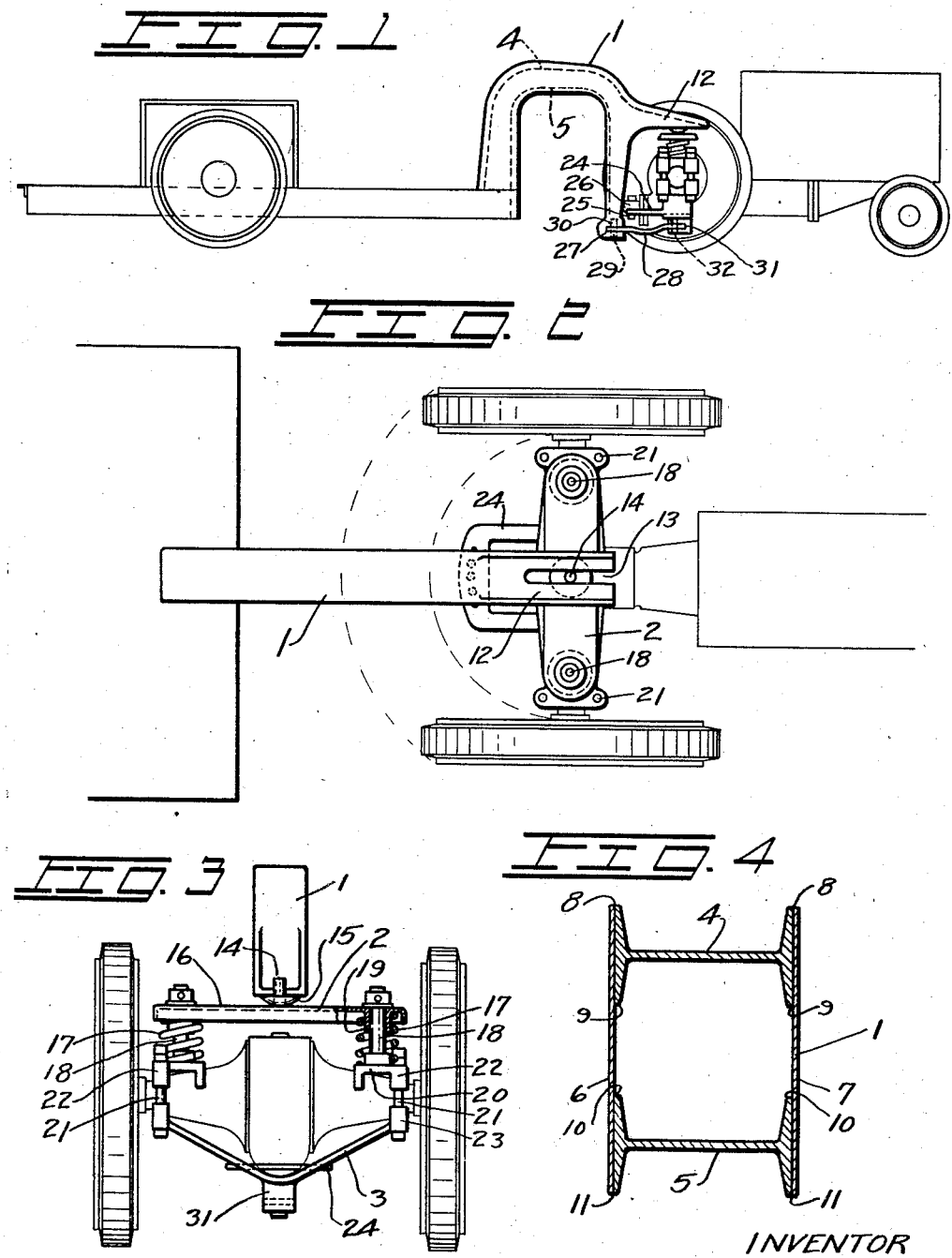
INVENTOR
Axel O. Nordine
Harry Bowen
ATTORNEY Patented Apr. 14, 1925.

1,533,449

UNITED STATES PATENT OFFICE.

AXEL O. NORDINE, OF SEATTLE, WASHINGTON, ASSIGNOR TO PUGET ELECTRIC WELDING INC., OF SEATTLE, WASHINGTON.

TRAILER.

Application filed December 31, 1923. Serial No. 683,704.

*To all whom it may concern:*

Be it known that I, AXEL O. NORDINE, a citizen of the United States, residing at Seattle, county of King, and State of Washington, have invented new and useful Improvements in Trailers; and I do hereby declare that the following is a full, clear, and exact specification, such as will enable others skilled in the art to which it appertains to make and use the same.

The invention is a trailer for Fordson tractors or the like which is connected to the rear of the tractor in such a manner that the pivot point will be on the center of the rear axle and so that the rear wheels of the tractor may pass under the connection.

The object of the invention is to provide a means for connecting a trailer to Fordson tractors or the like so that the pivot point of the connection will be in the center of the rear axle.

Another object of the invention is to provide a means for connecting trailers to Fordson tractors or the like which will make it possible for the rear wheels of the tractor to pass completely under the connection.

And a further object of the invention is to provide a simple and efficient means for connecting a trailer to a Fordson tractor so that the tractor may be free to move about the pivot point without skidding the front wheels.

With these ends in view the invention embodies a trailer having a goose-neck at its forward end which has one arm that may rest upon a saddle on top of the rear axle of a Fordson tractor or the like, and another arm which is connected by a bar to a yoke on the lower side of the axle and at the center.

Other features and advantages of the invention will be seen from the following description taken in connection with the drawings, wherein:—

Figure 1 is a side view showing the tractor and trailer with the connection between them.

Figure 2 is a plan view of the connection.

Figure 3 is a section showing the connection at the axle of the tractor.

Figure 4 is a cross section through the goose-neck showing its construction.

In the drawings I have shown my trailer connection as it would be constructed wherein numeral 1 indicates the goose-neck, numeral 2 the saddle on the upper side of the axle of the tractor, and numeral 3 the yoke on the lower side. The goose-neck 1 may be constructed of channels 4 and 5 which are bent to conform to the shape of the inner and outer surfaces of the goose-neck as shown in Figure 1. The sides are covered with plates 6 and 7 and these are welded to the beams at the points 8, 9, 10 and 11. The upper beam 4 extends outward as shown in Figure 1 to form an arm 12 which is provided with a slot 13 in its center through which a pin 14, having a rounded washer 15 on it, projects. The washer 15 rests upon a bolster 16 which forms a horizontal member of the saddle 2 and this bolster 16 rests upon springs 17 on bolts 18 that pass through sleeves 19 on the under side of the bolster and are supported on members 20 which rest upon the casing of the axle and are held to it by bolts 21 passing through hubs 22 and also through hubs 23 of the yoke 3 below the axle. The yoke 3 extends downward so that it will pass under the central portion of the axle and is attached through a bar 24 and a bolt 25 to the projection 26 that is provided at the rear of the tractor for the clevis.

At the lower end of the forward section of the member 1 is a socket 27 in which one end of a bar 28 may be pivotally held by a pin 29 as shown in dotted lines in Figure 1. The pin may be held in place by a smaller pin or screw 30. The opposite end of the bar may be pivotally held in a socket 31 by a pin 32 similar to the pin 29 and this pin may be held in place in the same manner. The opposite end or base of the goose-neck may be rigidly attached to the floor of a trailer in any suitable manner.

Although Figure 4 shows the preferred design and construction of the goose-neck, it is understood that this may be made in any suitable manner and of any suitable material. It is also understood that the trailer may be of any suitable design or size and may be attached to the base of the goose-neck in any suitable manner.

It will be understood that other changes may be made in the construction without departing from the spirit of the invention. One of which changes may be in the design of the saddle or bolster or in the means of attaching it to the tractor; another may be in the type of connection between the gooseneck and the saddle; another may be in the design of the yoke under the tractor axle, or in the means for attaching it to the gooseneck; and still another may be in the means for attaching the yoke to the axle.

The construction will be readily understood from the foregoing description. To use the device it may be assembled as shown and it will be seen that with a device constructed in this manner it is possible to make a very short turn which will make it particularly adaptable for dock use. It will also be seen that as the pivot point is in the center of the axle and not a short distance behind it, it will be possible to turn without causing a lateral twist between the pivot points so that there will not be a tendency for the front wheels to skid while making a turn.

Having thus fully described the invention, what I claim as new and desire to secure by Letters Patent, is:—

1. In a trailer for tractors or the like a connection at the forward end in the form of an inverted U with an arm projecting from its forward side, said arm resting upon a spring saddle on top of the axle of the tractor, and a connection between the lower ends of the forward side of the U and the yoke on the under side of the axle of the tractor.

2. In a means for pivotally connecting a trailer to a tractor, a member in the form of an inverted U with the lower end of its rear leg rigidly attached to the tractor and the lower end of its forward leg pivotally attached to the axle of the tractor at a point below the center of the axle, said forward leg having an arm projecting forward and resting upon a saddle on top of the axle.

3. In a trailer, a U shaped frame rigidly attached to the forward end, means for pivotally connecting the lower end of the forward leg to a point below the axle of a tractor and in the transverse center, and an arm projecting forward from the forward leg and resting upon a spring saddle on top of the axle.

4. In a trailer having a gooseneck at its forward end, a yoke for attaching the forward end of the gooseneck to the center of the axle of the tractor to which the trailer may be attached, said yoke having a bar pivoted to it below the center of the axle and also pivoted to the forward end of the gooseneck, and a spring saddle that may be placed on top of the axle upon which the projection from the forward end of the gooseneck may rest.

AXEL O. NORDINE.